(12) United States Patent
Xue et al.

(10) Patent No.: US 11,858,017 B2
(45) Date of Patent: Jan. 2, 2024

(54) IN-SITU VAPOR INJECTION THERMAL DESORPTION DEVICE

(71) Applicant: INSTITUTE OF ROCK AND SOIL MECHANICS, CHINESE ACADEMY OF SCIENCES, Wuhan (CN)

(72) Inventors: Qiang Xue, Wuhan (CN); Yuan Li, Wuhan (CN); Mingli Wei, Wuhan (CN); Jiangshan Li, Wuhan (CN); Yong Wan, Wuhan (CN); Zhixiang Chen, Wuhan (CN); Xin Chen, Wuhan (CN); Lei Liu, Wuhan (CN)

(73) Assignee: INSTITUTE OF ROCK AND SOIL MECHANICS, CAS, Wuhan (CN)

( * ) Notice: Subject to any disclaimer, the term of this patent is extended or adjusted under 35 U.S.C. 154(b) by 0 days.

(21) Appl. No.: 17/931,128

(22) Filed: Sep. 11, 2022

(65) Prior Publication Data
US 2023/0211395 A1      Jul. 6, 2023

(30) Foreign Application Priority Data
Jan. 6, 2022   (CN) .......................... 202210010601.5

(51) Int. Cl.
   B09C 1/06           (2006.01)
(52) U.S. Cl.
   CPC ................ B09C 1/065 (2013.01); B09C 1/06 (2013.01); B09C 2101/00 (2013.01)
(58) Field of Classification Search
   CPC ............ B09C 1/06; B09C 1/062; B09C 1/065
   See application file for complete search history.

(56) References Cited

U.S. PATENT DOCUMENTS 4,844,797 A  *  7/1989  Wells .................... E21B 43/121
                                                   210/138
2017/0312798 A1*  11/2017  Haemers .................. B09C 1/06

FOREIGN PATENT DOCUMENTS

| AU | 2002365145 A1 | * | 7/2003 | .......... B01D 53/002 |
| AU | 2003285830 A1 | * | 6/2005 | ............. B09C 1/002 |
| AU | 2011322707 A1 | * | 5/2013 | ............... B09C 1/00 |

(Continued)

*Primary Examiner* — Frederick L Lagman
(74) *Attorney, Agent, or Firm* — Syncoda LLC; Feng Ma

(57) ABSTRACT

An in-situ vapor injection thermal desorption device includes a sectional combined input head, several intermediate connectors and a bottom protector connected in series from top to bottom. The in-situ vapor injection thermal desorption device further includes several water-vapor coupling injection activation chips, selectively disposed below any of the intermediate connectors; the sectional combined input head is provided with a high-pressure-gas inlet, several pairs of heat-transfer-oil inlets and heat-transfer-oil outlets, and several pairs of hot-water inlets and hot-water outlets; the water-vapor coupling injection activation chip is provided with several gas-liquid spraying holes. The disclosure is an assembling structure; the number of the water-vapor coupling injection activation chips can be increased or reduced according to remediation depth on an actual site; it can be repeatedly used, uniformly sprayed, and enables the vapor for treating the organic soil to be generated in situ and remediating organic pollution sites in a low-carbon, energy-saving way.

8 Claims, 7 Drawing Sheets

(56) References Cited

FOREIGN PATENT DOCUMENTS

| BE | 1028844 A1 | * | 6/2022 |
| CN | 112517621 A | * | 3/2021 |
| KR | 20080008154 A | * | 1/2008 |

* cited by examiner

IN-SITU VAPOR INJECTION THERMAL DESORPTION DEVICE

CROSS-REFERENCE TO RELATED APPLICATIONS

The present disclosure claims priority to Chinese Patent Application No. 202210010601.5 filed on Jan. 6, 2022, the disclosure of which is hereby incorporated by reference in its entirety.

BACKGROUND

Soil pollution in China occurs with the development of industrialization and urbanization and is extremely serious. While promoting economic and social development, industrialization and urbanization have also caused serious environmental pollution. Among them, the problem of soil pollution is increasingly prominent. In 2014, the Ministry of Environmental Protection and the Ministry of Land and Resources jointly released the "Survey Report on National Soil Pollution Status", and the results showed that the total unqualified rate of the soil in China was 16.1%, wherein the ratios of little pollution area, slight pollution area, medium pollution area, and heavy pollution area are respectively 11.2%, 2.3%, 1.5%, and 1.1%. From the perspective of pollution categories, the organic pollutants out of limits are mainly three categories, namely, HCH, DDT, and PAHs, for which the unqualified rates are 0.5%, 1.9%, and 1.4%, respectively. The existence of organic pollutants in the soil will threaten the soil and groundwater environment and become potential "pollution bombs"; furthermore, the residue of the organic pollutants in the soil will accumulate, expand or exchange with the atmosphere and cause damage to the health of human body, animals and plants.

According to the "Application Guide to the Remediation Technology of Polluted Field" issued by the Ministry of Ecology and Environment, soil remediation technology can be classified in different ways in terms of disposal sites, remediation methods, soil medium, and occurrence of pollutants. Standard technologies include solidification/stabilization, oxidation-reduction, co-disposal of cement kiln, and vapor extraction. These technologies can be divided into in-situ and ex-situ remediation technology. They can be divided into biological, physical, chemical, as well as physicochemical remediation technologies according to remediation mechanisms. At present, the remediation process is mainly ex-situ remediation and chemical remediation. Therefore, a green and in-situ remediation technology needs to be developed.

Vapor injection technology is an in-situ remediation technology that uses the contact of the vapor and the organic polluted soil to desorb and remove the volatile organic pollutants in the soil. The soil vapor extraction technology has characteristics of good operability, capable of processing a wide range of organics, no destruction of soil structure, and producing no pollutants. At present, in order to inject the vapor into the soil body, a vapor generator or a similar device is used on the ground to generate water vapor, and then the water vapor is transported into the soil body through a transportation device. The soil vapor extraction technology is currently less studied in China but is widely studied in the United States and Europe, which all adopt methods of ex-situ generating vapor, such as described in the literature (Abd RAHMAN et al., 2016; Mumford et al., 2021; PENG et al., 2013). However, the method of ex-situ generating heat vapor and transporting it into the soil body will lead to large heat loss and waste energy. The heat loss rate of water vapor in the literature is mostly about 50%. Furthermore, in some engineering applications, the water vapor quickly condenses in the soil body.

SUMMARY

The disclosure relates to the field of polluted soil remediation technology, in particular to an in-situ vapor injection thermal desorption device.

To address the problems in the art, the disclosure provides an in-situ vapor injection thermal desorption rod, which can generate abundant vapors in situ to enable the vapor for processing the organic soil to be sprayed fully and evenly in the organic polluted soil, preventing heat loss during transportation, and which is an efficient and sustainable vapor generation method.

According to an aspect of the present disclosure, an in-situ vapor injection thermal desorption device is provided. The in-situ vapor injection thermal desorption device may include a sectional combined input head, several intermediate connectors and a bottom protector, wherein the sectional combined input head, the intermediate connectors and the bottom protector are connected in series from top to bottom, wherein the in-situ vapor injection thermal desorption device further includes several water-vapor coupling injection activation chips, selectively disposed below any of the intermediate connectors; the sectional combined input head is provided with a high-pressure-gas inlet, several pairs of heat-transfer-oil inlets and heat-transfer-oil outlets, and several pairs of hot-water inlets and hot-water outlets;

wherein a first high-pressure-gas through hole, several first heat-transfer-oil through holes, several second heat-transfer-oil through holes, several first hot-water through holes, and several second hot-water through holes are disposed inside each of the intermediate connectors and run therethrough from top to bottom; the first heat-transfer-oil through hole and the second heat-transfer-oil through hole adjacent to each other are communicated through a first connection hole, and the first hot-water through hole and the second hot-water through hole adjacent to each other are communicated with through a second connection hole;

wherein a second high-pressure-gas through hole, several third heat-transfer-oil through holes, several fourth heat-transfer-oil through holes, several third hot-water through holes and several fourth hot-water through holes are disposed inside each of the water-vapor coupling injection activation chips and run therethrough from top to bottom; and several gas-liquid spraying holes are uniformly and transversely arranged inside each of the water-vapor coupling injection activation chips; each gas-liquid spraying hole has at least one outlet end and at least one inlet end, the at least one outlet end is disposed on a side of the water-vapor coupling injection activation chip, and the at least one inlet end is communicated with the second high-pressure-gas through hole; and a central portion of each gas-liquid spraying hole is communicated with a corresponding third hot-water through hole or a corresponding fourth hot-water through hole;

wherein the high-pressure-gas inlet, the first high-pressure-gas through hole and the second high-pressure-gas through hole are communicated with one another correspondingly; the heat-transfer-oil inlets, the first heat-transfer-oil through holes and the third heat-transfer-oil through holes are communicated with one another correspondingly; the heat-transfer-oil outlets, the second heat-transfer-oil through holes and the fourth heat-transfer-oil through holes are communicated with one another correspondingly; the hot-water inlets, the first hot-water through holes and the third hot-water through holes are communicated with one another correspondingly; and the hot-water outlets, the second hot-water through holes and the fourth hot-water through holes are communicated with one another correspondingly.

In some embodiments of the present disclosure, each gas-liquid spraying hole is a Y-shaped through hole including two inlet ends and one outlet end; the two inlet ends of the gas-liquid spraying hole are communicated with the second high-pressure-gas through holes, respectively; the third hot-water through hole or the fourth hot-water through hole is communicated with a connection portion between the inlet ends and the outlet end of an adjacent gas-liquid spraying hole by using a third connection pipe arranged transversely.

In some embodiments of the present disclosure, the outlet end of the gas-liquid spraying hole has a flaring shape.

In some embodiments of the present disclosure, an end surface of the bottom protector connected to an adjacent intermediate connector is a closed surface.

In some embodiments of the present disclosure, an annular mounting board is disposed on an outer side of the sectional combined input head and is used to mount the in-situ vapor injection thermal desorption device on a thermal enhanced vapor extraction box; the mounting board has several through holes thereon; and the mounting board is located below the heat-transfer-oil inlets, the heat-transfer-oil outlets, the high-pressure-gas inlet, the hot-water inlets, and the hot-water outlets.

In some embodiments of the present disclosure, the sectional combined input head, the intermediate connectors, the water-vapor coupling injection activation chip and the bottom protector are connected through flanges.

In some embodiments of the present disclosure, the number of each of the heat-transfer-oil inlets, the heat-transfer-oil outlets, the hot-water inlets, and the hot-water outlets is two;

wherein each intermediate connector has two first heat-transfer-oil through holes, two second heat-transfer-oil through holes, two first hot-water through holes, and two second hot-water through holes; the first high-pressure-gas through hole is disposed at a middle portion of the intermediate connector; and the first heat-transfer-oil through holes, the second heat-transfer-oil through holes, the first hot-water through holes and the second hot-water through holes are uniformly distributed around the first high-pressure-gas through hole;

wherein each water-vapor coupling injection activation chip has two third heat-transfer-oil through holes, two fourth heat-transfer-oil through holes, two third hot-water through holes, and two fourth hot-water through holes; the second high-pressure-gas through hole is disposed at a middle portion of the water-vapor coupling injection activation chip; and the third heat-transfer-oil through holes, the fourth heat-transfer-oil through holes, the third hot-water through holes, and the fourth hot-water through holes are uniformly distributed around the second high-pressure-gas through hole; and four gas-liquid spraying holes are disposed on the water-vapor coupling injection activation chip.

In some embodiments of the present disclosure, the in-situ vapor injection thermal desorption device includes four intermediate connectors, including a first intermediate connector, a second intermediate connector, a third intermediate connector, and a fourth intermediate connector respectively;

the in-situ vapor injection thermal desorption device includes three water-vapor coupling injection activation chips, including a first water-vapor coupling injection activation chip, a second water-vapor coupling injection activation chip, and a third water-vapor coupling injection activation chip respectively, and the first water-vapor coupling injection activation chip, the second water-vapor coupling injection activation chip, and the third water-vapor coupling injection activation chip are disposed below the second intermediate connector, the third intermediate connector, and the fourth intermediate connector respectively;

wherein four first connection boards are disposed on an outer side of a connection portion between the sectional combined input head and the first intermediate connector; and an upper end and a lower end of each first connection board are fixed to the sectional combined input head and the first intermediate connector respectively through bolts;

wherein four second connection boards are disposed on an outer side of a connection portion between the first intermediate connector and the second intermediate connector; and an upper end and a lower end of each second connection board are fixed to the first intermediate connector and the second intermediate connector respectively through bolts;

wherein a third connection board is disposed on an outer side of a connection portion between the second intermediate connector and the third intermediate connector; and an upper end, a middle portion and a lower end of the third connection board are fixed to the second intermediate connector, the first water-vapor coupling injection activation chip and the third intermediate connector respectively through bolts; and the third connection board is provided with a second through hole corresponding to the outlet end of the gas-liquid spraying hole of the first water-vapor coupling injection activation chip;

wherein a fourth connection board is disposed on an outer side of a connection portion between the third intermediate connector and the fourth intermediate connector; and an upper end, a middle portion and a lower end of the fourth connection board are fixed to the third intermediate connector, the second water-vapor coupling injection activation chip and the fourth intermediate connector respectively through bolts; and the fourth connection board is provided with a third through hole corresponding to the outlet end of the gas-liquid spraying hole of the second water-vapor coupling injection activation chip;

wherein a fifth connection board is disposed on an outer side of a connection portion between the fourth intermediate connector and the bottom protector; and an upper end, a middle portion and a lower end of the fifth connection board are fixed to the fourth intermediate connector, the third water-vapor coupling injection activation chip and the bottom protector respectively through bolts; and the fifth connection board is provided with a fourth through hole corresponding to the outlet end of the gas-liquid spraying hole of the third water-vapor coupling injection activation chip.

Beneficial Effects of the Present Disclosure:

(1) The intermediate connectors are used to connect respective water-vapor coupling injection activation chips, which can make the height of the in-situ vapor injection thermal desorption device match the height of a box containing the organic polluted soil so that the water vapor can even reach the inside of the box containing the organic polluted soil. The intermediate connectors can also increase the distance between two water-vapor coupling injection activation chips according to need so as to avoid waste of vapor caused by the two water-vapor coupling injection activation chips being too close.

(2) The gas-liquid spraying holes are uniformly arranged in the water-vapor coupling injection activation chip. When the in-situ vapor injection thermal desorption device is disposed at a middle position of the box containing the organic polluted soil, the gas-liquid spraying holes arranged uniformly can spray vapor evenly to the surroundings of the in-situ vapor injection thermal desorption device.

(3) The gas-liquid spraying hole is a Y-shaped through hole, with two inlet ends and one outlet end, which can further pressurize two phase substances, i.e., the high-pressure air and the hot-water. The pressure at the central connection portion of the Y-shaped through hole is greater than the pressure at the outlet end of the Y-shaped through hole. Therefore, the pressure gradient difference can be utilized to realize the gas tight effect, achieving the function of only spraying out the water vapor without condensing the water vapor or causing backflow. The design of high-pressure gas and the Y-shaped through hole can both increase the distance of vapor spraying so that the vapor can reach the inner wall of the box.

(4) The outlet of the Y-shaped through hole is of a flared shape. The spraying angle can be adjusted through an outlet end having different flaring degrees.

(5) The in-situ vapor injection thermal desorption device of the present disclosure uses an assembling structure, and the number of the water-vapor coupling injection activation chips can be flexibly increased or reduced according to the remediation depth, and it can be used repeatedly. A protection well can be constructed on the site and then the in-situ vapor injection thermal desorption device is mounted, which prevents the damage to the vapor injection thermal desorption device by a side pressure of the deep soil and affecting its cyclic service life.

Figure 1:
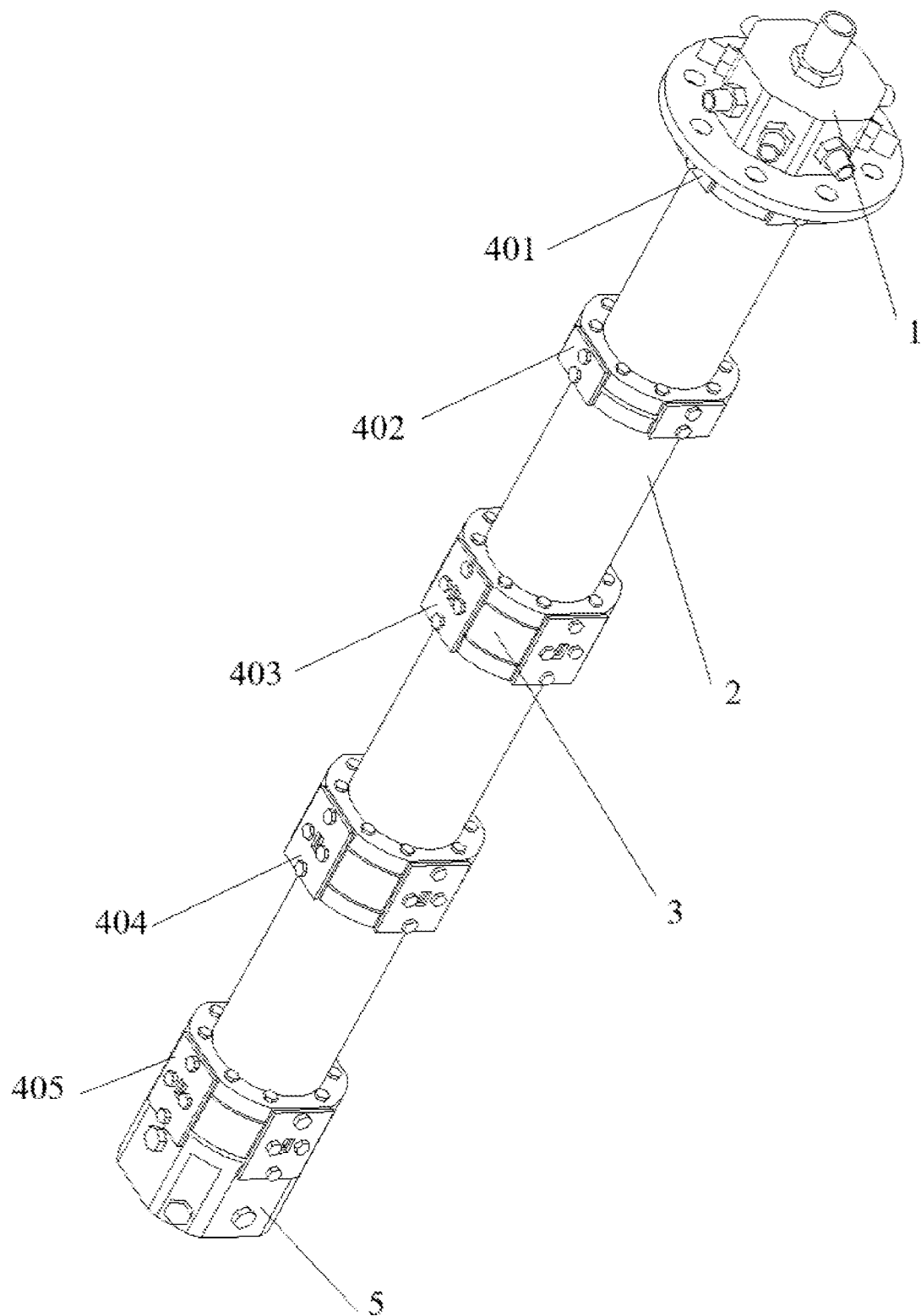
FIG. 1 is a diagram showing a stereo structure according to the disclosure.

List of Reference Numerals:

sectional combined input head—1; intermediate connector—2; first high-pressure-gas through hole—201; first heat-transfer-oil through hole 202; second heat-transfer-oil through hole—203; first hot-water through hole—204; second hot-water through hole—205; first connection hole—206; second connection hole—207; water-vapor coupling injection activation chip—3; second high-pressure-gas through hole—301; third heat-transfer-oil through hole—302; fourth heat-transfer-oil through hole—303; third hot-water through hole 304; fourth hot-water through hole—305; gas-liquid spraying hole—306; first connection board—401; second connection board—402; third connection board—403; fourth connection board—404; fifth connection board—405; bottom protector—5.

DETAILED DESCRIPTION

A detailed description of the technical schemes of the present disclosure will be made below regarding the drawings, but the protection scope of the present disclosure is not limited to the embodiments.

Figure 2:
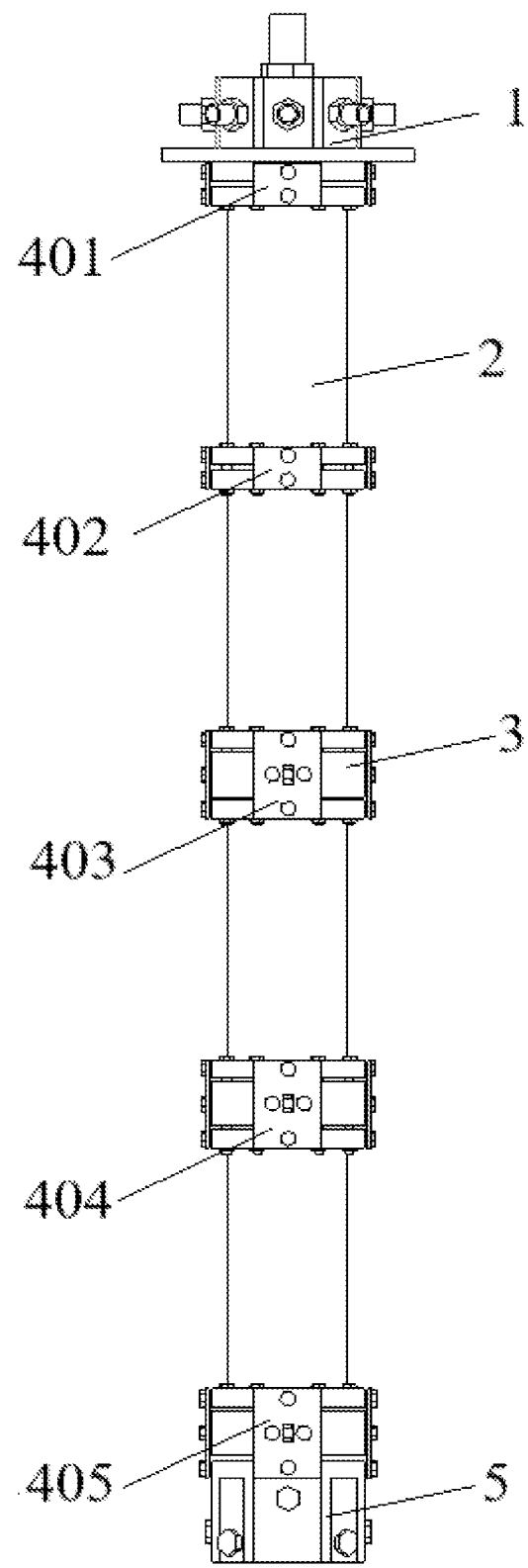
FIG. 2 shows a front view according to the disclosure.
Figure 3:
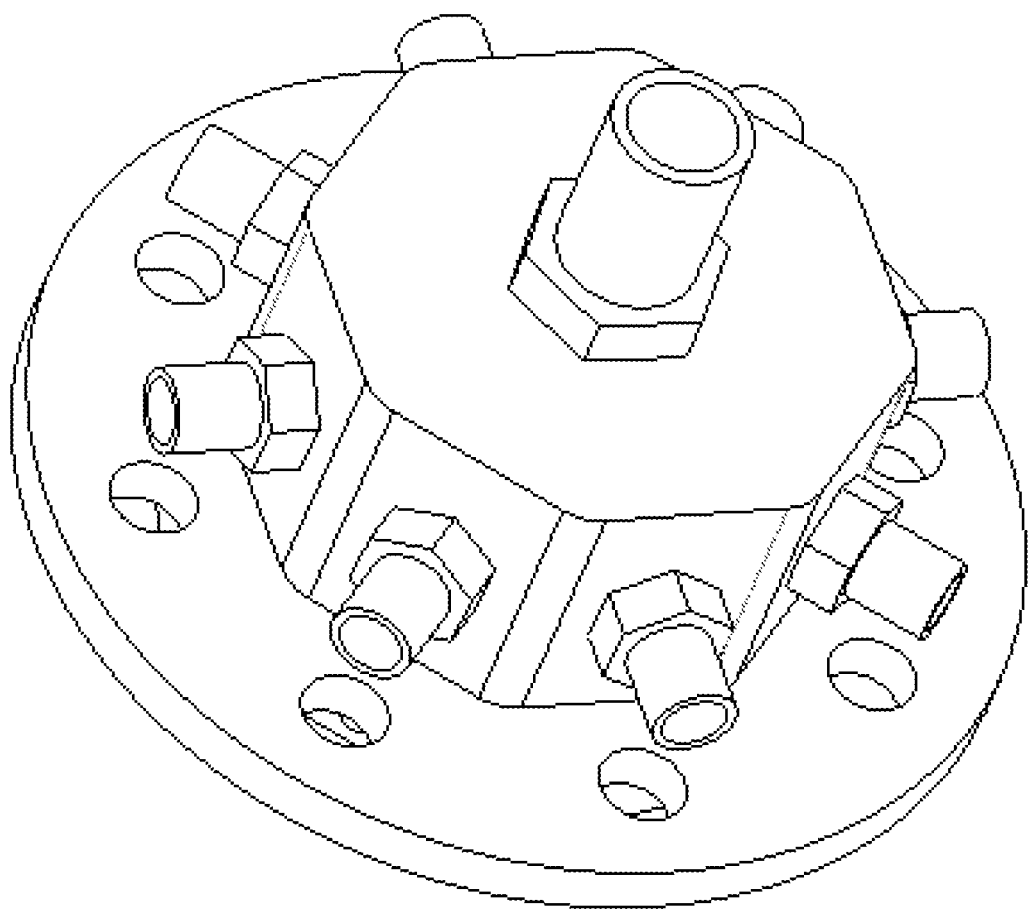
FIG. 3 shows a structural diagram of a sectional combined input head according to the disclosure.
Figure 4:
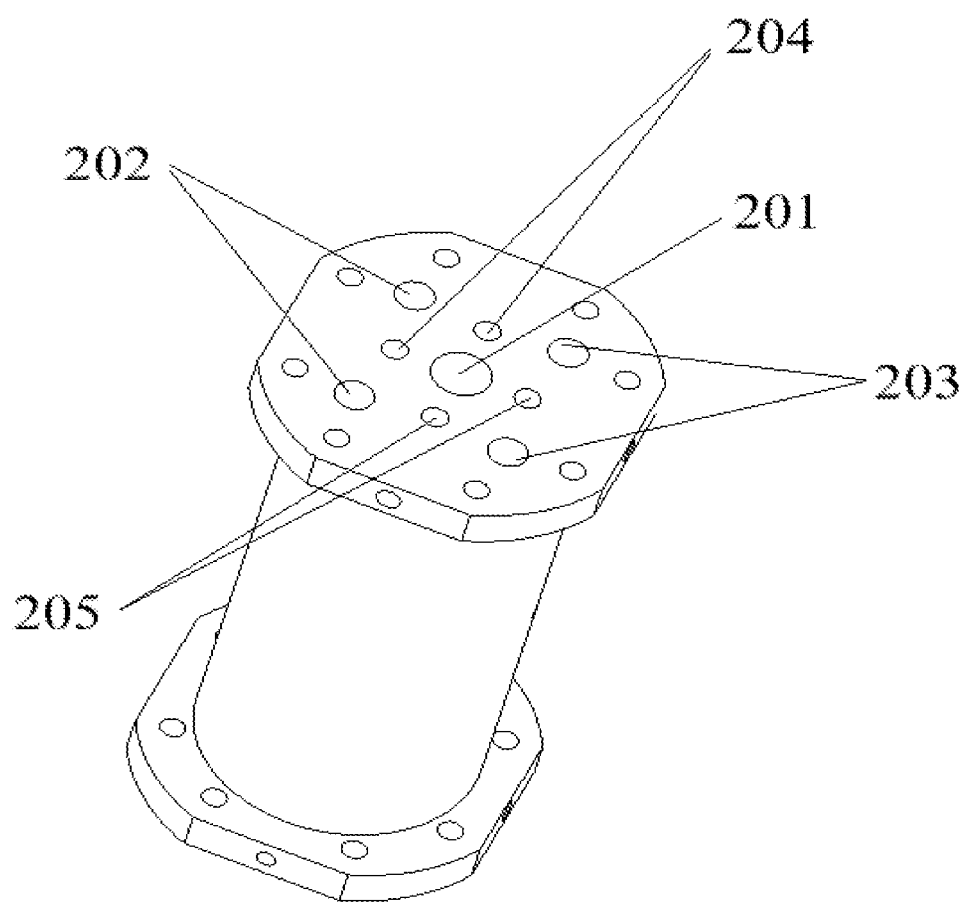
FIG. 4 shows a stereo structure of the intermediate connector according to the disclosure.
Figure 5:
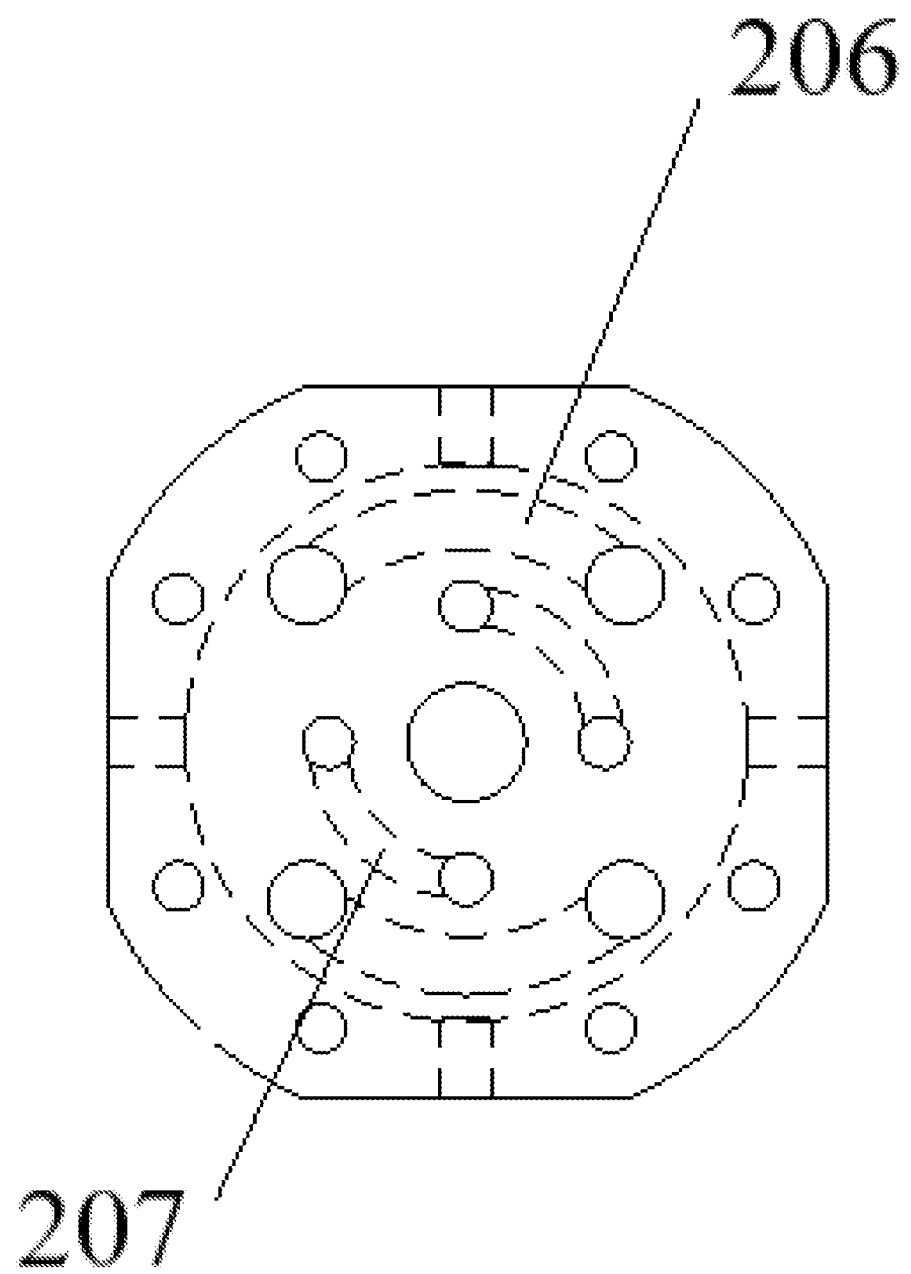
FIG. 5 shows a front view of an intermediate connector according to the disclosure.
Figure 6:
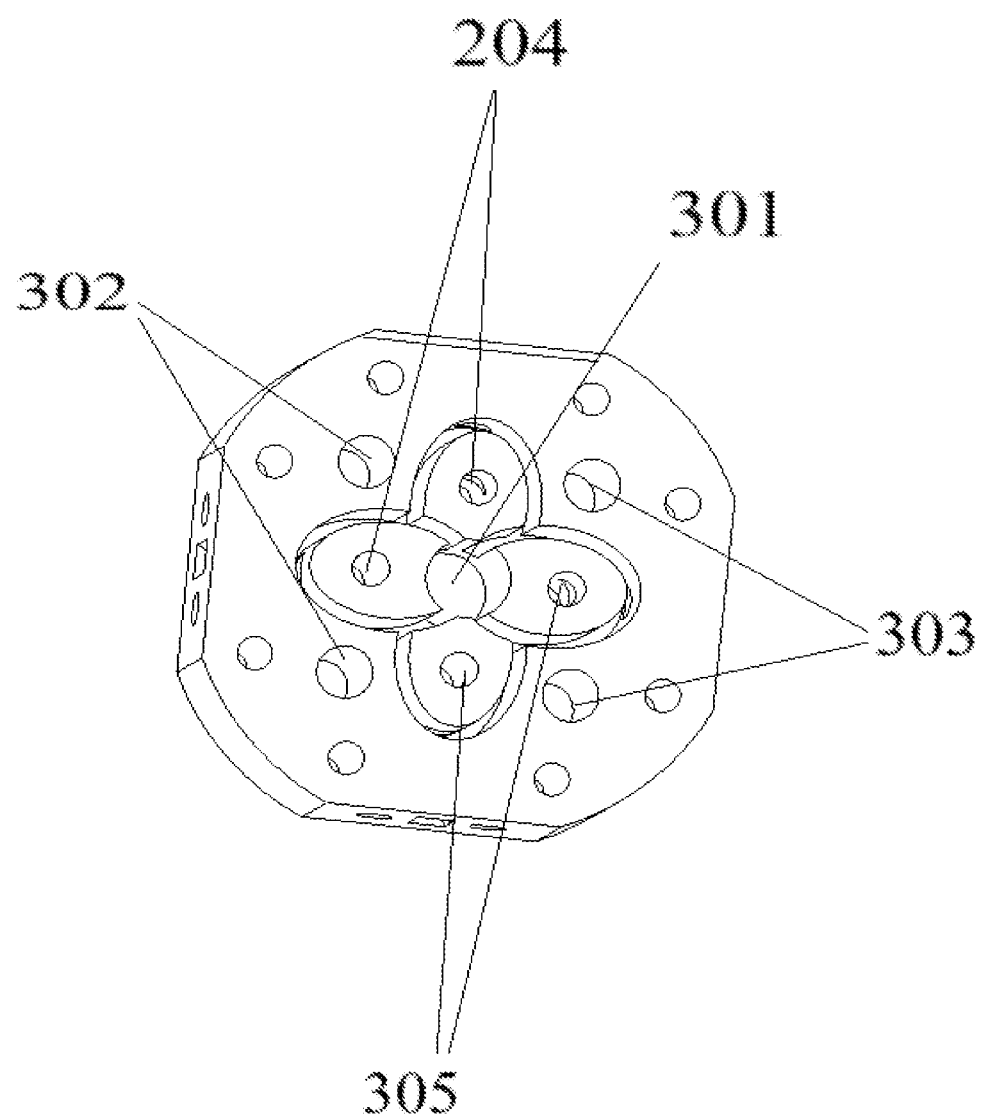
FIG. 6 shows a stereo structure of a water-vapor coupling injection activation chip according to the disclosure.
Figure 7:
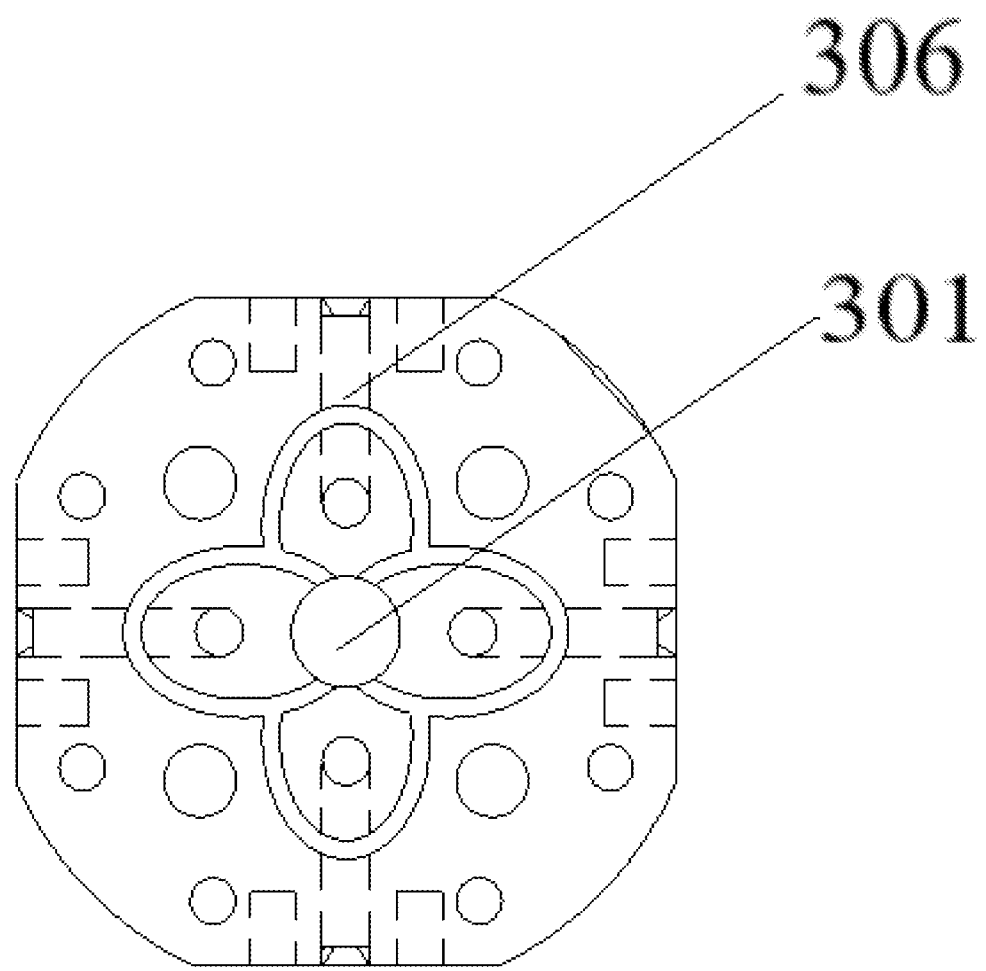
FIG. 7 shows a front view of a water-vapor coupling injection activation chip according to the disclosure.

FIGS. 1-7 show an in-situ vapor injection thermal desorption device, which includes a sectional combined input head 1, several intermediate connectors 2 and a bottom protector 5 connected in order from top to bottom. The in-situ vapor injection thermal desorption device further includes several water-vapor coupling injection activation chip 3. There are four intermediate connectors 2, namely, a first intermediate connector, a second intermediate connector, a third intermediate connector, and a fourth intermediate connector. There are three water-vapor coupling injection activation chips, namely, a first water-vapor coupling injection activation chip, a second water-vapor coupling injection activation chip, and a third water-vapor coupling injection activation chip, and they are disposed below the second intermediate connector, the third intermediate connector, and the fourth intermediate connector, respectively.

The sectional combined input head 1, the intermediate connectors 2, the water-vapor coupling injection activation chips 3, and the bottom protector 5 are connected through flanges. In addition to the flange connection, four first connection boards 401 are disposed on an outer side of the connection portion of the sectional combined input head 1 and the first intermediate connector. An upper end and a lower end of each first connection board 401 are fixed to the sectional combined input head and the first intermediate connector respectively through bolts.

Four second connection boards 402 are disposed on an outer side of the connection portion of the first intermediate connector and the second intermediate connector, and an upper end and a lower end of each second connection board 402 are fixed to the first intermediate connector and the second intermediate connector respectively through bolts.

A third connection board 403 is disposed on an outer side of the connection portion of the second intermediate connector and the third intermediate connector. An upper end, a middle portion and a lower end of the third connection board 403 are fixed to the second intermediate connector, the first water-vapor coupling injection activation chip and the third intermediate connector, respectively, through bolts. The third connection board 403 is provided with a second through hole corresponding to an outlet end of gas-liquid spraying holes on the first water-vapor coupling injection activation chip.

A fourth connection board 404 is disposed on an outer side of the connection portion of the third intermediate connector and the fourth intermediate connector. An upper end, a middle portion and a lower end of the fourth connection board 404 are fixed to the third intermediate connector, the second water-vapor coupling injection activation chip and the fourth intermediate connector, respectively, through bolts. The fourth connection board 404 is provided with a third through hole corresponding to an outlet end of gas-liquid spraying holes on the second water-vapor coupling injection activation chip.

A fifth connection board 405 is disposed on an outer side of the connection portion of the fourth intermediate connector and the bottom protector. An upper end, a middle portion and a lower end of the fifth connection board 405 are fixed to the fourth intermediate connector, the third water-vapor coupling injection activation chip and the bottom protector, respectively, through bolts. The fifth connection board 405 is provided with a fourth through hole corresponding to an outlet end of gas-liquid spraying holes on the third water-vapor coupling injection activation chip.

The sectional combined input head 1 is provided with a high-pressure-gas inlet, two heat-transfer-oil inlets, two heat-transfer-oil outlets, two hot-water inlets and two hot-water outlets thereon. An annular mounting board is disposed on an outer side of the sectional combined input head 1 for mounting the in-situ vapor injection thermal desorption device on a thermal enhanced vapor extraction box. The mounting board is provided with several through holes. The mounting board is located below the heat-transfer-oil inlets, the heat-transfer-oil outlets, the high-pressure-gas inlet, the hot-water inlets, and the hot-water outlets.

In some embodiments of the present disclosure, one first high-pressure-gas through hole 201, two first heat-transfer-oil through holes 202, two second heat-transfer-oil through holes 203, two first hot-water through holes 204 and two second hot-water through holes 205 are disposed inside the intermediate connector 2 and run through up and down. The first heat-transfer-oil through hole 202 and the second heat-transfer-oil through hole 203 adjacent to each other are communicated through a first connection hole 206. The first hot-water through hole 204 and the second hot-water through hole 205 adjacent to each other are communicated through a second connection hole 207. The first high-pressure-gas through hole is disposed at the middle of the intermediate connector 2. The first heat-transfer-oil through holes 202, the second heat-transfer-oil through holes 203, the first hot-water through holes 204, and the second hot-water through holes 205 are uniformly distributed around the first high-pressure-gas through hole 201.

Furthermore, one second high-pressure gas through hole 301, two third heat-transfer-oil through holes 302, two fourth heat-transfer-oil through holes 303, and two third hot-water through holes 304 and two fourth hot-water through holes 305 are disposed inside the water-vapor coupling injection activation chip 3 and run through up and down. The second high-pressure gas through hole 301 is disposed at the middle of the water-vapor coupling injection activation chip 3. The third heat-transfer-oil through holes 302, the fourth heat-transfer-oil through holes 303, the third hot-water through holes 304 and the fourth hot-water through holes 305 are distributed around the second high-pressure-gas through hole 301. Four gas-liquid spraying holes 306 are uniformly disposed inside the water-vapor coupling injection activation chip 3 and arranged transversely therein. The gas-liquid spraying hole 306 is a Y-shaped through hole, including two inlet ends and one outlet end. The outlet end of the gas-liquid spraying hole 306 is disposed on the side of the water-vapor coupling injection activation chip 3. The inlet end of the gas-liquid spraying hole 306 is communicated with the second high-pressure gas through hole. The two inlet ends are respectively communicated with the second high-pressure-gas through hole. The third hot-water through hole 304 or the fourth hot-water through hole 305 is communicated with a connection portion between the inlet end and the outlet end of an adjacent gas-liquid spraying hole 306 through a third connection pipe arranged transversely. The outlet end of the gas-liquid spraying hole 306 has a flared shape.

The high-pressure-gas inlet, the first high-pressure-gas through hole 201 and the second high-pressure-gas through hole 301 are communicated with one another correspondingly. The heat-transfer-oil inlet, the first heat-transfer-oil through hole 202 and the third heat-transfer-oil through hole 302 are communicated with one another correspondingly.

The heat-transfer-oil outlet, the second heat-transfer-oil through hole 203 and the fourth heat-transfer-oil through hole 303 are communicated with one another correspondingly. The hot-water inlet, the first hot-water through hole 204 and the third hot-water through hole 304 are communicated with one another correspondingly. The hot-water outlet, the second hot-water through hole 205 and fourth hot-water through hole 305 are communicated with one another correspondingly.

An end surface of the bottom protector 5 connected to the adjacent intermediate connector 2 is a closed surface.

The heat-transfer-oil enters the first heat-transfer-oil through the hole of the intermediate connector and the third heat-transfer-oil through the hole inside the water-vapor coupling injection activation chip from the heat-transfer-oil inlet of the sectional combined input head, and the first heat-transfer-oil through the hole and the second heat-transfer-oil through hole of the intermediate connector are communicated through the first connection hole so that the heat-transfer-oil enters the second heat-transfer-oil through hole of the intermediate connector and the fourth heat-transfer-oil through the hole inside the water-vapor coupling injection activation chip and then flows out from the heat-transfer-oil outlet.

The hot-water enters the first hot-water through the hole of the intermediate connector and the third hot-water through the hole inside the water-vapor coupling injection activation chip from the hot-water inlet of the sectional combined input head, and the first hot-water through the hole and the second hot-water through hole of the intermediate connector are communicated with each other through the second connection hole so that the hot-water enters the second heat-transfer-oil through hole of the intermediate connector and the fourth heat-transfer-oil through hole of the water-vapor coupling injection activation chip and a portion of the hot-water enters the gas-liquid spraying hole of the water-vapor coupling injection activation chip, so as to be sprayed out from the outlet end of the gas-liquid spraying hole under the drive of high-pressure-gas, and a portion of the hot-water is discharged from the hot-water outlet.

The intermediate connector and the water-vapor coupling injection activation chip can be assembled together. In an on-site application, according to actual remediation depth, several water-vapor coupling injection activation chips can be flexibly provided to ensure that a deep polluted zone can be remediated by spraying. The intermediate connectors are used to connect the respective water-vapor coupling injection activation chips and enable the height of the in-situ vapor injection thermal desorption device to match the depth of the organic polluted soil, so that the water vapor can reach the organic polluted soil uniformly. The intermediate connector can also increase the distance between the two water-vapor coupling injection activation chips according to the need so as to avoid waste of vapor caused by the two water-vapor coupling injection activation chips being too close.

The gas-liquid spraying holes are uniformly disposed in the water-vapor coupling injection activation chip. When the in-situ vapor injection thermal desorption device is disposed in the middle position of the box containing organic polluted soil, the gas-liquid spraying holes arranged uniformly can spray vapor evenly to the surroundings of the in-situ vapor injection thermal desorption device.

The gas-liquid spraying hole is a Y-shaped through hole, with two inlet ends and one outlet end, which can further pressurize two-phase substances, i.e., the high-pressure gas and the hot-water. The pressure at the central connection portion of the Y-shaped through the hole is greater than the pressure at the outlet end of the Y-shaped though hole. Therefore, the pressure gradient difference can be utilized to realize gas tight effect, achieving the function of only spraying out the water vapor without condensing the water vapor and causing backflow. The design of high-pressure gas and the Y-shaped through hole can both increase the distance of vapor spraying so that the vapor can reach the inner wall of the box.

The outlet of the Y-shaped through hole is of a flared shape. The spraying angle can be adjusted through an outlet end having different flaring degrees.

In addition to the flange connection between the sectional combined input head, the intermediate connector, the water-vapor coupling injection activation chip and the bottom protector, the connection board is also used to reinforce the connection and further prevent the departure of components.

The entire structure combined by the sectional combined input head, the intermediate connector, the water-vapor coupling injection activation chips and the bottom protector is in a segmented form, such as a skeleton structure. In order to ensure the working stability of the in-situ vapor injection thermal desorption device in an in-situ application on the spot, especially in a zone for deep polluted organic soil remediation, it needs to perform a good construction treatment at the injection point to guarantee the stability of the soil body and prevent the damage to the in-situ vapor injection thermal desorption device by a side pressure of the soil body. During good construction, a Geoprobe is used to place a porous, high-intensive, corrosion-resistant ABS plastic tube well in a remediation zone in advance so that it cannot only stabilize the soil layer and protect the in-situ vapor injection thermal desorption device but also can be used as a subsequent remediation monitoring spot or a secondary spot for supplemental remediation.

Although the present disclosure has been illustrated and explained as above with reference to specific preferred embodiments, it must not be interpreted as limiting the invention itself. Instead, various changes can be made in forms and details without departing from the spirit and scope of the disclosure defined by the claims.

What is claimed is:

1. An in-situ vapor injection thermal desorption device, comprising a sectional combined input head (1), several intermediate connectors (2) and a bottom protector (5) connected in series from top to bottom, wherein the in-situ vapor injection thermal desorption device further comprises several water-vapor coupling injection activation chips (3) selectively disposed below any of the intermediate connectors; the sectional combined input head (1) is provided with a high-pressure-gas inlet, several pairs of heat-transfer-oil inlets and heat-transfer-oil outlets, and several pairs of hot-water inlets and hot-water outlets;

wherein a first high-pressure-gas through hole (201), several first heat-transfer-oil through holes (202), several second heat-transfer-oil through holes (203), several first hot-water through holes (204), and several second hot-water through holes (205) are disposed inside each intermediate connector and run therethrough from top to bottom; the first heat-transfer-oil through hole (202) and the second heat-transfer-oil through hole (203) adjacent to each other are communicated through a first connection hole (206), and the first hot-water through hole (204) and the second hot-water through hole (205) adjacent to each other are communicated through a second connection hole (207);

wherein a second high-pressure-gas through hole (301), several third heat-transfer-oil through holes (302), several fourth heat-transfer-oil through holes (303), several third hot-water through holes (304) and several fourth hot-water through holes (305) are disposed inside each water-vapor coupling injection activation chip (3) and run therethrough from top to bottom; and several gas-liquid spraying holes (306) are uniformly and transversely arranged inside each water-vapor coupling injection activation chip (3); each gas-liquid spraying hole (306) has at least one outlet end and at least one inlet end, the at least one outlet end is disposed on a side of the water-vapor coupling injection activation chip (3), and the at least one inlet end is communicated with the second high-pressure-gas through hole (301); and a central portion of each gas-liquid spraying hole (306) is communicated with the third hot-water through hole (304) or fourth hot-water through hole (305);

wherein the high-pressure-gas inlet, the first high-pressure-gas through hole (201) and the second high-pressure-gas through hole (301) are communicated with one another correspondingly; the heat-transfer-oil inlets, the first heat-transfer-oil through holes (202) and the third heat-transfer-oil through holes (302) are communicated with one another correspondingly; the heat-transfer-oil outlets, the second heat-transfer-oil through holes (203) and the fourth heat-transfer-oil through holes (303) are communicated with one another correspondingly; the hot-water inlets, the first hot-water through holes (204) and the third hot-water through holes (304) are communicated with one another correspondingly; and the hot-water outlets, the second hot-water through holes (205) and the fourth hot-water through holes (305) are communicated with one another correspondingly.

2. The in-situ vapor injection thermal desorption device according to claim 1, wherein each gas-liquid spraying hole (306) is a Y-shaped though hole comprising two inlet ends and one outlet end; the two inlet ends of the gas-liquid spraying hole (306) are communicated with the second high-pressure-gas through holes respectively; the third hot-water through hole (304) or the fourth hot-water through hole (305) is communicated with a connection portion between the inlet ends, and the outlet end of an adjacent gas-liquid spraying hole (306) through a third connection pipe arranged transversely.

3. The in-situ vapor injection thermal desorption device according to claim 2, wherein the outlet end of the gas-liquid spraying hole (306) has a flaring shape.

4. The in-situ vapor injection thermal desorption device according to claim 1, wherein an end surface of the bottom protector (5) connected to an adjacent intermediate connector (2) is a closed surface.

5. The in-situ vapor injection thermal desorption device according to claim 1, wherein an annular mounting board is disposed on an outer side of the sectional combined input head (1) for mounting the in-situ vapor injection thermal desorption device on a thermal enhanced vapor extraction box; the annular mounting board has several through holes thereon; and the annular mounting board is located below the heat-transfer-oil inlets, the heat-transfer-oil outlets, the high-pressure-gas inlet, the hot-water inlets, and the hot-water outlets.

6. The in-situ vapor injection thermal desorption device according to claim 1, wherein the sectional combined input head (1), the intermediate connectors (2), the water-vapor coupling injection activation chip (3) and the bottom protector (5) are connected with one another through flanges.

7. The in-situ vapor injection thermal desorption device according to claim 2, wherein a number of each of the heat-transfer-oil inlets, the heat-transfer-oil outlets, the hot-water inlets, and the hot-water outlets is two;
  wherein each intermediate connector (2) has two first heat-transfer-oil through holes (202), two second heat-transfer-oil through holes (203), two first hot-water through holes (204), and two second hot-water through holes (205); the first high-pressure-gas through hole (201) is disposed at a middle portion of the intermediate connector (2); and the first heat-transfer-oil through holes (202), the second heat-transfer-oil through holes (203), the first hot-water through holes (204) and the second hot-water through holes (205) are uniformly distributed around the first high-pressure-gas through hole (201);
  each water-vapor coupling injection activation chip (3) has two third heat-transfer-oil through holes (302), two fourth heat-transfer-oil through holes (303), two third hot-water through holes (304), and two fourth hot-water through holes (305); the second high-pressure-gas through hole (301) is disposed at a middle portion of the water-vapor coupling injection activation chip (3); and the third heat-transfer-oil through holes (302), the fourth heat-transfer-oil through holes (303), the third hot-water through holes (304), and the fourth hot-water through holes (305) are uniformly distributed around the second high-pressure-gas through hole (301); and four gas-liquid spraying holes (306) are disposed on the water-vapor coupling injection activation chip (3).

8. The in-situ vapor injection thermal desorption device according to claim 6, wherein the in-situ vapor injection thermal desorption device comprises four intermediate connectors (2), comprising a first intermediate connector, a second intermediate connector, a third intermediate connector, and a fourth intermediate connector respectively;
  wherein the in-situ vapor injection thermal desorption device comprises three water-vapor coupling injection activation chips (3), comprising a first water-vapor coupling injection activation chip, a second water-vapor coupling injection activation chip, and a third water-vapor coupling injection activation chip, respectively, and the first water-vapor coupling injection activation chip, the second water-vapor coupling injection activation chip, and the third water-vapor coupling injection activation chip are disposed below the second intermediate connector, the third intermediate connector, and the fourth intermediate connector respectively;
  wherein four first connection boards (401) are disposed on an outer side of a connection portion between the sectional combined input head (1) and the first intermediate connector; and an upper end and a lower end of each first connection board (401) are fixed to the sectional combined input head and the first intermediate connector respectively through bolts;
  four second connection boards (402) are disposed on an outer side of a connection portion between the first intermediate connector and the second intermediate connector; and an upper end and a lower end of each second connection board (402) are fixed to the first intermediate connector and the second intermediate connector respectively through bolts;
  a third connection board (403) is disposed on an outer side of a connection portion between the second intermediate connector and the third intermediate connector; and an upper end, a middle portion and a lower end of the third connection board (403) are fixed to the second intermediate connector, the first water-vapor coupling injection activation chip and the third intermediate connector respectively through bolts; and the third connection board (403) is provided with a second through hole corresponding to the outlet end of the gas-liquid spraying hole of the first water-vapor coupling injection activation chip;
  a fourth connection board (404) is disposed on an outer side of a connection portion between the third intermediate connector and the fourth intermediate connector; and an upper end, a middle portion and a lower end of the fourth connection board (404) are fixed to the third intermediate connector, the second water-vapor coupling injection activation chip and the fourth intermediate connector respectively through bolts; and the fourth connection board (404) is provided with a third through hole corresponding to the outlet end of the gas-liquid spraying hole of the second water-vapor coupling injection activation chip; and
  a fifth connection board (405) is disposed on an outer side of a connection portion between the fourth intermediate connector and the bottom protector; and an upper end, a middle portion and a lower end of the fifth connection board (405) are fixed to the fourth intermediate connector, the third water-vapor coupling injection activation chip and the bottom protector respectively through bolts; and the fifth connection board (405) is provided with a fourth through hole corresponding to the outlet end of the gas-liquid spraying hole of the third water-vapor coupling injection activation chip.

* * * * *